United States Patent
Sen et al.

(10) Patent No.: US 6,654,693 B2
(45) Date of Patent: Nov. 25, 2003

(54) ANGLE DEPENDENT SURFACE MULTIPLE ATTENUATION FOR TWO-COMPONENT MARINE BOTTOM SENSOR DATA

(75) Inventors: Mrinal K. Sen, Austin, TX (US); Paul L. Stoffa, Spicewood, TX (US); Faqi Liu, Stillwater, OK (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 10/045,466

(22) Filed: Oct. 22, 2001

(65) Prior Publication Data

US 2002/0156583 A1 Oct. 24, 2002

Related U.S. Application Data

(63) Continuation-in-part of application No. 09/794,570, filed on Feb. 27, 2001, now abandoned.

(51) Int. Cl.[7] ................................................. G01V 1/28
(52) U.S. Cl. ........................................... 702/17; 702/14
(58) Field of Search ................................ 702/7, 14, 17

(56) References Cited

U.S. PATENT DOCUMENTS

| | | |
|---|---|---|
| 4,134,097 A | 1/1979 | Cowles |
| 4,486,865 A | 12/1984 | Ruehle |
| 4,520,467 A | 5/1985 | Berni |

(List continued on next page.)

OTHER PUBLICATIONS

Robinson, E.A., *Seismic Inversion and Deconvolution/Dual–Sensor Technology,* Handbook of Geophysical Exploration, Seismic Exploration, vol. 4B, pp. 1–340.

Liu, F., *Surface Multiple Attenuation Operators In The Plane Wave Domain: Theory and Applications,* The University of Texas at Austin, Aug., 1999, pp. 1–193.

Barr, F., *Recent Advances in Ocean–Bottom Cable Seismic Technology,* Western Geophysical, OTC 8316, 1997, pp. 357–358.

Gal'perin, E., *Vertical Seismic Profiling,* Society of Exploration Geophysics, Special Publication No. 12, pp. 96–99.

Schneider, W., et al., *Collection and Analysis of Pacific Ocean–Bottom Seismic Data,* Geophysics, vol. XXIX, No. 5, Oct., 1964) pp. 743–771.

Schneider, W., et al., *Ocean–Bottom Seismic Measurements off the California Coast,* Journal of Geophysical Research, vol. 69, No. 6, Mar. 15, 1964.

(List continued on next page.)

Primary Examiner—Marc S. Hoff
Assistant Examiner—Anthony Gutierrez
(74) Attorney, Agent, or Firm—E. Eugene Thigpen

(57) ABSTRACT

A method of processing data that uses an angle dependent filter from two-component sensor data allows for attenuation of free surface multiples. Typically, the sensors that are used to produce two-component ocean bottom sensor data are hydrophones and geophones. The method decomposes the recorded dual sensor data into upgoing and downgoing wavefields by combining the recorded pressure at the hydrophone with the vertical particle velocity from the geophone recorded at the ocean floor. Surface multiple attenuation is accomplished by application of an incident angle dependent deconvolution of the downgoing wavefield from the upgoing wavefield. The method uses an angle dependent filter to calibrate the geophone response so that the different coupling of the two instruments and associated noise are taken into account.

In a further embodiment, a method of attenuation of multiple reflections in seismic data is provided. The seismic data comprises pressure data and particle velocity data. The method comprises deconvolving the seismic data, and applying a moving average operator to the seismic data.

19 Claims, 9 Drawing Sheets

U.S. PATENT DOCUMENTS

| | | | |
|---|---|---|---|
| 4,752,916 A | | 6/1988 | Loewenthal |
| 4,979,150 A | | 12/1990 | Barr |
| 5,010,526 A | * | 4/1991 | Linville, Jr. et al. .......... 367/46 |
| 5,163,028 A | | 11/1992 | Barr et al. |
| 5,235,554 A | | 8/1993 | Barr et al. |
| 5,365,492 A | | 11/1994 | Dragoset, Jr. |
| 5,396,472 A | | 3/1995 | Paffenholz |
| 5,696,734 A | | 12/1997 | Corrigan |
| 6,094,620 A | * | 7/2000 | Gasparotto et al. ........... 702/14 |
| 6,219,621 B1 | * | 4/2001 | Hornbostel .................. 702/16 |
| 2002/0138202 A1 | * | 9/2002 | Martinez .................... 702/17 |
| 2003/0048696 A1 | * | 3/2003 | Duren ........................ 367/24 |

OTHER PUBLICATIONS

Adair, R., et al., *Infrasonic Seismic and Acoustic Measurements in the Deep Ocean,* IEEE Journal of Oceanic Engineering, vol. 13, No. 4, Oct. 1988.

Loewenthal, D., et al., *Deterministic Estimation of a Wavelet Using Impedance Type Technique,* Geophysical Prospecting 33, pp. 956–969, 1985.

Krohn, C., et al., *Comparisons of Downhole Geophones and Hydrophones,* Geophysics, vol. 57, No. 6, (Jun., 1992), pp. 841–847.

*Homogeneous, Isotropic, Elastic Solid,* Seismic Waves, pp. 15–43.

* cited by examiner

ANGLE DEPENDENT SURFACE MULTIPLE ATTENUATION FOR TWO-COMPONENT MARINE BOTTOM SENSOR DATA

BACKGROUND OF THE INVENTION

This patent application is a continuation-in-part claiming benefit under 35 U.S.C. §120 of U.S. patent application Ser. No. 09/794,570, filed on Feb. 27, 2001, now abandoned incorporated herein by reference.

The present invention relates generally to marine seismic exploration, and more particularly to a marine seismic measurement system that allows for attenuation of free surface multiples in two-component marine bottom sensor data.

Marine seismic wave measurement systems are used to take seismic profiles of underwater geological configurations. One procedure of marine seismic measurement involves the use of a marine bottom cable. Surveys using marine bottom cables are often employed in areas that are populated with numerous obstacles, such as drilling and production platforms. In a procedure using marine bottom cable, bottom cables are deployed along the marine bottom. Often, multiple cables are deployed in parallel. Each bottom cable has a plurality of sensor pairs placed at regular intervals along the cable. Each sensor pair contains a pressure sensor, such as a hydrophone, and a particle velocity sensor, such as a geophone. A gimbal mechanism within each geophone ensures that the sensing elements of the geophones are vertically oriented.

Acoustic energy is generated in the vicinity of the marine bottom cables using an acoustic energy source such as an air gun array or a marine vibrator array. An air gun discharges air under very high pressure into the water. Marine vibrators typically include a pneumatic or hydraulic actuator that causes an acoustic piston to vibrate at a range of selected frequencies. The vibrations of the acoustic vibrator produce pressure differentials in the water that generate acoustical energy pulses. Source acoustical waves travel downward through the water and into the earth as seismic waves. The source waves strike interfaces between formations in the earth. A portion of the source wave is reflected upwards from the interface towards the marine bottom. The sensor array on the marine bottom receives the reflected waves and converts the waves into signals that are recorded as sensor data. The sensor data is processed to provide information about the structure of the formations beneath the marine bottom.

The sensor array receives not only the reflected waves of interest, but also the source waves and reverberated waves. Reverberated waves are waves that have been reflected from the water-air interface back towards the marine bottom. Such reverberated waves are referred to as free surface multiples or surface multiples. The free surface multiples may be significant in amplitude and may be difficult to differentiate from the desired reflected waves.

The use of dual sensor measurements, namely pressure and vertical particle velocity, allow for the attenuation of free surface multiples. U.S. Pat. Nos. 5,163,028; 5,365,492; 5,524,100, and 5,621,700 describe methods of attenuating free surface multiples, and each of these patents are incorporated by reference as if fully set forth herein. The methods of attenuating free surface multiples detailed in the above referenced patents do not adequately take into consideration the angle dependence of the upgoing and downgoing wavefields. Also, the methods of attenuating multiples detailed in the above referenced patents do not adequately take into consideration the angle dependency of the response of each sensor of a sensor pair. The use of methods of attenuating multiples that do not consider both the angle dependency of the upgoing and downgoing wavefields and the angle dependency of the response of each sensor of a sensor pair may lead to inaccurate determinations of the formations present beneath the marine bottom.

Existing methods of deconvolution for multiple attenuation of dual sensor data carry out the calibration and deconvolution filter in the distance-time domain, (x,t). The basic equations for deconvolution of upgoing and downgoing waves are valid only in the angle (plane wave) domain. Seismograms recorded from a single shot will have energy propagating at all possible angles, so processing data in the distance-time domain can only have limited success.

SUMMARY OF THE INVENTION

The problems outlined above are in large part to be solved by a system and method of marine seismic exploration that takes into account angle dependencies during the processing of two-component sensor data. Consideration of the angle dependencies of upgoing wavefields, downgoing wavefields, and the sensor enhance the attenuation of free surface multiples that are present in two-component sensor data. The ability to provide enhanced attenuation of free surface multiples allow for more accurate determination of the formations present beneath a marine bottom.

In one example embodiment, a method is used to decompose the recorded dual sensor data into upgoing and downgoing wavefields in the plane wave domain. The method finds an angle dependent calibration factor that allows the calibration of the recorded pressure data with respect to the recorded vertical particle velocity data. The angle dependent calibration factor takes into consideration the angle dependencies of the hydrophone and the geophone, as well as noise associated with the recording geometry. Attenuation of multiples is accomplished by application of an incident angle dependent deconvolution of the downgoing wavefield from the upgoing wavefield calculated from the calibrated pressure and vertical particle velocity data.

In a further embodiment, a method of attenuation of multiple reflections in seismic data is provided. The seismic data comprises pressure data and particle velocity data. The method comprises deconvolving the seismic data, and applying a moving average operator to the seismic data.

In a further embodiment, a system for attenuation of multiple reflections in seismic data is provided. The seismic data comprises pressure data and particle velocity data. The system comprises means for deconvolving the seismic data, and means for applying a moving average operator to the seismic data.

In a further embodiment, seismic data is provided. The seismic data is processed by a method comprising deconvolving the seismic data, and applying a moving average operator to the seismic data.

BRIEF DESCRIPTION OF THE DRAWINGS

Further advantages of the present invention will become apparent to those skilled in the art with the benefit of the following detailed description of example embodiments and upon reference to the accompanying drawings in which.

DETAILED DESCRIPTION OF EXAMPLE EMBODIMENTS OF THE PRESENT INVENTION

Figure 1:
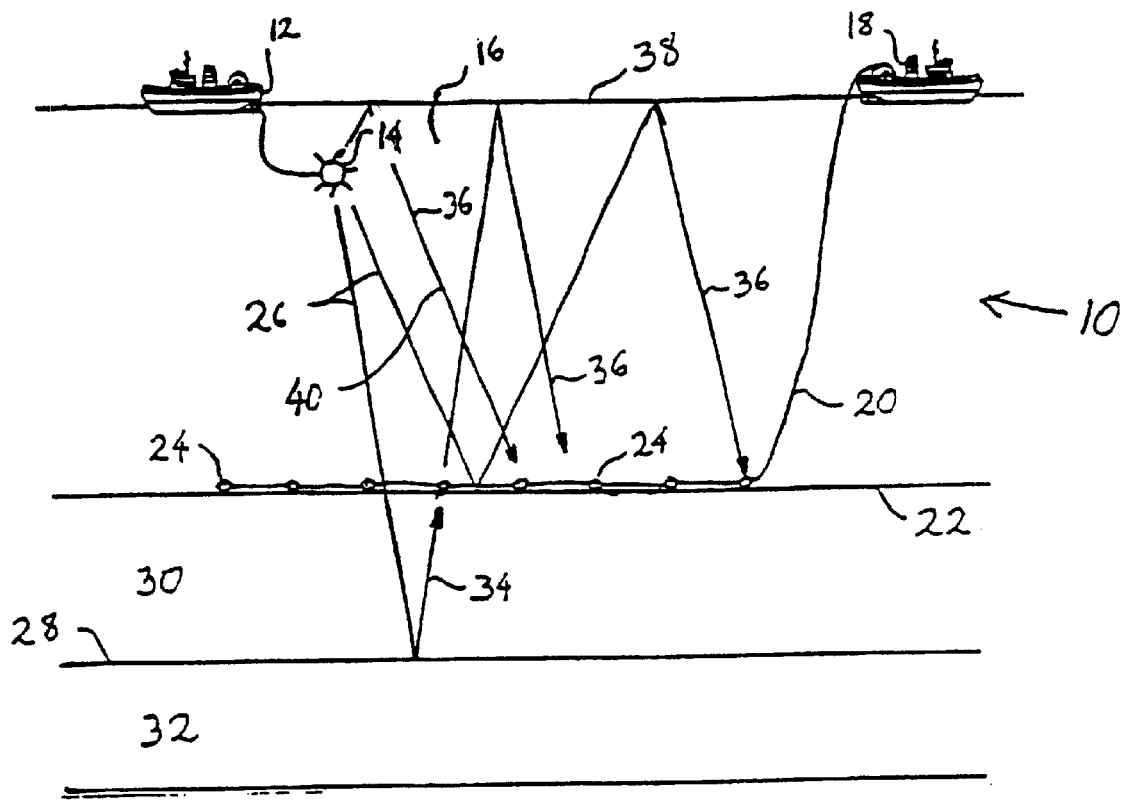
FIG. 1 is an illustration of a marine seismic survey system.

With reference to the drawings, and particularly to FIG. 1, a marine seismic survey system is generally designated by reference numeral 10. In one embodiment of the present invention, the system 10 includes a seismic survey ship 12 that tows an acoustic energy source 14 through a body of water 16. In various embodiments, the acoustic energy source is an array of acoustic energy sources. In alternate embodiments, the acoustic energy source is an air gun, a marine vibrator, or another device that generates acoustic waves. The construction and operation of acoustical energy sources is well known in the art and is not described in detail herein. The activation of the acoustic energy source is referred to as "shooting."

In a further embodiment, the system 10 includes receiving ship 18. The receiving ship 18 deploys bottom cable 20 on marine bottom 22. The receiving ship deploys an array of bottom cables in parallel lines. Each bottom cable 20 carries at least one sensor pair 24, and preferably, each bottom cable carries a plurality of sensor pairs. Each sensor pair 24 includes a pressure sensing transducer, such as a hydrophone, and a particle velocity sensor, such as a geophone. As is well known in the art, each marine geophone includes a gimbal mechanism to ensure that the sensing element of the geophone is vertically oriented during use. In a further embodiment, each hydrophone and geophone sends separate data signals to the receiving ship 18. The data is recorded by a multi-channel seismic recording system that selectively amplifies, conditions, and records time-varying electrical signals. In still a further embodiment, the system also digitizes the received signals to facilitate signal analysis. Any of a variety of seismic recording systems are used to record the data.

To take a marine seismic survey, the receiver ship 18 positions the bottom cable 20 on the marine bottom 22. In an embodiment, shooting takes place while the survey ship 12 moves at a constant speed along a set of survey lines with respect to the cable 20. The location and depth of each sensor pair 24, and the location of the acoustical energy source 14 at the time of each shot are recorded. After the survey ship 12 completes the survey line, the receiving ship 18 retrieves the cable 20 and re-deploys the cable in a new position. After re-deployment of the cable 20, the survey ship 12 shoots another set of survey lines.

During data collection, seismic waves 26 generated by the source 14 travel away from the source. Portions of the waves travel downward and into the land beneath the marine bottom 22. The waves are reflected off of interfaces between subterranean formations, such as interface 28 between subterranean formations 30 and 32 as shown in FIG. 1. Reflected waves 34 from the interfaces travel upwards and impinge upon a sensor pair 24. The sensor pairs 24 detect the reflected waves 34 and transmit signals along the cable 20 to the receiving ship 18. The receiving ship 18 records the data so that the data can be subsequently processed to map the location of interfaces 28 between subterranean formations.

The sensor pairs 24 receive not only the reflected waves 34, which are also known as primaries, but also the source waves 26 and free surface multiples 36. The free surface multiples 36 may be significant in amplitude and may be difficult to differentiate from the desired reflected waves 34. Free surface multiples that originate from the source, contact the air/surface interface 38, and travel towards the marine bottom are referred to as ghosts 40.

In most marine seismic data acquisition situations, the energy source 14 is placed above the marine bottom 22. All upgoing wavefields in the data result from reflections of downgoing incident waves to the marine bottom. Mathematically, this is formulated by the following convolution, $$d(t)^{up} = r(t) \oplus d(t)^{dn} \quad (1)$$

where $d(t)^{up}$ are the upgoing wavefields, which can be either primaries 34 or multiples 36; and $d(t)^{dn}$ is the downgoing wavefield, which may be direct transmission from the source 26 or reflection events 36 (source, primaries or multiples) that are bounced back at the air/surface interface 38 (receiver ghosts). In equation (1), r(t) is the reflectivity of the structure, which includes those reflections taking place both at the marine bottom 22 and inside the land structure below the marine bottom; and t is the wavefield traveltime. The reflectivity, r(t), also includes internal multiple reflections.

The reflectivity, r, is obtained by deconvolving the downgoing wavefield from the upgoing wavefield. In one example embodiment, in the frequency domain, this is represented by a simple division:

$$R(\omega) = D(\omega)^{up}/D(\omega)^{dn} \quad (2)$$

where $R(\omega)$, $D(\omega)^{up}$, and $D(\omega)^{dn}$ are the Fourier transforms with respect to time of r(t), $d(t)^{up}$, and $d(t)^{dn}$, respectively.

The deconvolution based multiple attenuation method given in equation (2) requires separated upgoing and downgoing wavefields. The upgoing and downgoing wavefields are represented by the upgoing and downgoing pressure, or by the upgoing and downgoing vertical particle velocity.

In the above description, the angle dependency of the propagating waves was suppressed to present the fundamental ideas behind processing two-component marine bottom sensor data. The development below takes into account angle dependence.

Figure 2:
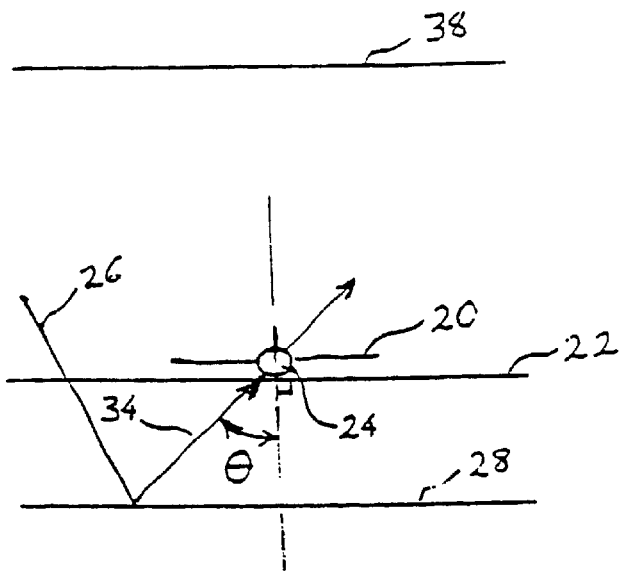
FIG. 2 is an illustration of a primary wave impinging a sensor pair.
Figures 4A, 4B:
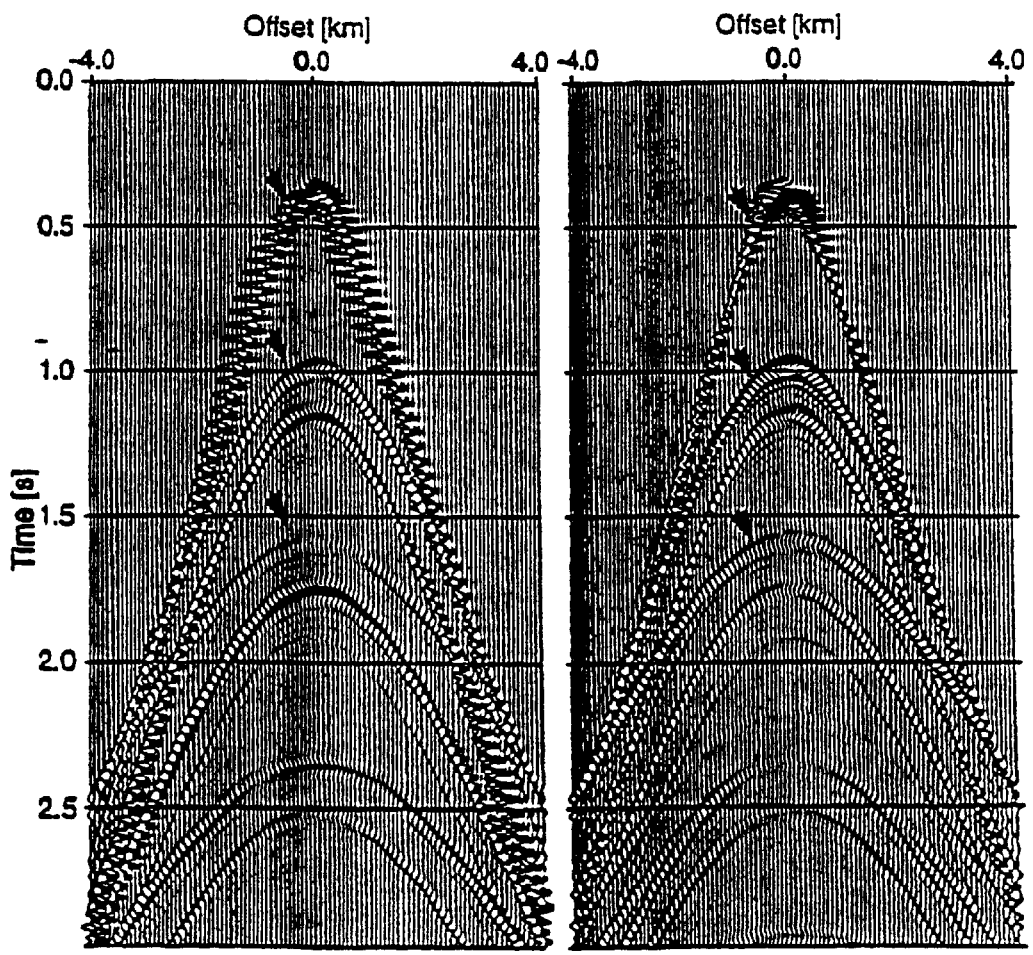
FIGS. 4a and 4b show pressure and vertical velocity data, respectively, from synthetic shot data for a 1-D four layer model.

In various embodiments, seismic data is recorded in the offset distance-time domain. Offset distance is the horizontal distance between the location of a sensor pair 24 and the location of the acoustic energy source 14 at the time of a shot. The seismic data recorded by a sensor pair 24 is a record of the variation in pressure, as measured by hydrophones, and vertical particle velocity, as measured by geophones, taken as a function of source-to-receiver offset distance and time. In a further embodiment, the acoustic energy source 14 is considered to be a point source. In practice, the source 14 will have a directivity that is angle dependent. In still a further embodiment, the response of a source is synthesized by summing the responses from a series of plane waves each characterized by the propagation angle of the plane wave. In yet a further embodiment, the source generated data recorded in the offset-time domain is decomposed into plane waves by means of a Radon transform. If $u(\underline{x},\omega)$ are the recorded data where $\underline{x}$ is the vector representing the source-to-receiver offset distance, and $\omega$ is the frequency, the plane wave response is given by:

$$\underline{u}(\tau,\underline{p}) = d\omega \int d\underline{x} u(\omega,\underline{p}) e^{-i(t-\underline{p}\cdot\underline{x})},$$

where $\underline{p}$ is the vector ray-parameter, and $\tau$ is the offset time, or $\tau = t - \underline{p}\cdot\underline{x}$. In a two-dimensional geometry, $\underline{p} = p_x = p = \sin\theta/\alpha$. The angle $\theta$ is the angle of propagation, and $\alpha$ is the velocity of sound in the medium. The angle of propagation $\theta$ is illustrated in FIG. 2 for a primary wave 34.

In a further embodiment, in the frequency-ray-parameter domain, the pressure recorded by hydrophones is given by the equation:

$$P(\omega,p) = c_1(p)(1+R(\omega,p))^{-1}(e^{i\omega q h_r} + R(\omega,p)e^{-i\omega q h_r})S(\omega,p)$$

The corresponding vertical velocity geophone data in the frequency-ray parameter domain is given by the equation:

$$V_z(\omega,p) = c_2(p)(1+R(\omega,p))^{-1}(R(\omega,p)e^{-i\omega q h_r} - e^{i\omega q h_r})S(\omega,p)$$

where p is the ray-parameter, $\theta$ is the angle of propagation; $\alpha$ is the sound velocity in the medium; R is the reflectivity of the structure referenced to the water surface, which includes the response of both the primaries and internal multiples; $h_r$ is the receiver depth; q is the vertical slowness, or $q = ((1/\alpha^2 - p^2))^{1/2}$; S is the source wavelet with source side ghosts; and $c_1$ and $c_2$ are two incident angle dependent coefficients defined by the ray-parameter and the parameters of the medium.

In a further embodiment, the upgoing and downgoing wavefields are obtained by combining the pressure and the vertical components of the vertical particle velocities in equations (3) and (4) to yield:

$$P(p)^{up} = (½)(P(p) + c(p)V_z(p)), \quad P(p)^{dn} = (½)(P(p) - c(p)V_z(p)), \quad (5)$$

where c(p) is a function defined by the parameters of the medium.

In some embodiments, equation (5) is considered to be an equation describing a system wherein the hydrophones and the geophones are perfectly coupled to the environment, wherein the geophones have the same response characteristics, and wherein the environment surrounding the sensor pair 24 is noise free. Direct application of equation (5) may not yield good results because, in reality, a sensor pair is not perfectly coupled to the environment, the instrument response characteristics of hydrophones and geophones are not the same, and sensor pairs 24 are not located in noise free environments. In further embodiments, the angle dependency of the sensor pairs require that the geophone data be calibrated to the pressure data, or vice versa, before the upgoing and downgoing wave components are determined.

In a further embodiment, from equations (3) and (4), the following equation is derived:

$$\hat{S}(\omega,p) = (½)[(1+Z(\omega,p))]P(\omega,p) + (½)c(\omega,p)[(1-Z(\omega,p))]V_z(\omega,p) \quad (6)$$

where $Z(\omega,p)$ is a filter and $\hat{S}(\omega,p)$ is a temporal Fourier transform of the time delayed source function, which is a function of the source excitation function $S(\omega,p)$, and is given by the equation:

$$\hat{S}(\omega,p) = (1/(2q\alpha^2))e^{-i\omega q h_r}(e^{i\omega q h_s} - e^{-i\omega q h_s}S(\omega,p)).$$

Here $h_s$ is the source depth. The term $\hat{S}(\omega,p)$ contains the source excitation function $S(\omega,p)$, the source side ghosts, and the transmission operator.

Since the source excitation function is always of finite duration in real data, there must exist a time $T_0(p)$, such that:

$$\hat{s}(t,p) = 0, \text{ if } t > t_0 + h_r/\alpha \quad (7)$$

where $\hat{s}(t,p)$ is the inverse temporal Fourier transform of $\hat{S}(\omega,p)$, which is the delayed source function.

In a further embodiment, equation (7) allows the hydrophone data and the geophone data to be calibrated so that the delayed source function is optimal. The calibration filter is designed such that the delayed source function defined in equation (7) will have minimum energy after a certain time. The time will include the source excitation function time duration and the sum of the propagation time of the energy of the source to go to the receiver and back to the surface. In a further embodiment, the calibration function, $f(\omega,p)$, is found by solving the following equation and constraint:

$$F^{-1}[(1+Z(\omega,p))P(\omega,p) + f(\omega,p)(1-Z(\omega,p))]V_z(\omega,p)\| = \text{minimum} \quad (8)$$

$$t > T_0 = t_0 + h_r/\alpha$$

where $F^{-1}$ stands for the inverse Fourier transform operator. In a further embodiment, a numerical method of solving for the calibration function in a least squares sense involves solving a system of equations with Toepliz structure to find a value for the calibration function for a given value of p. A person having ordinary skill in the art will recognize that in alternate embodiments, many methods are used to solve the equation and constraint of equation (8) to yield the optimum angle dependent calibration function.

Finding the calibration function allows for the calibration of hydrophone and geophone data. In yet a further embodiment, angle dependent multiple attenuated data is then obtained by forming and using an optimal filter from the calibrated data by application of equations (5) and (2).

Figure 3:
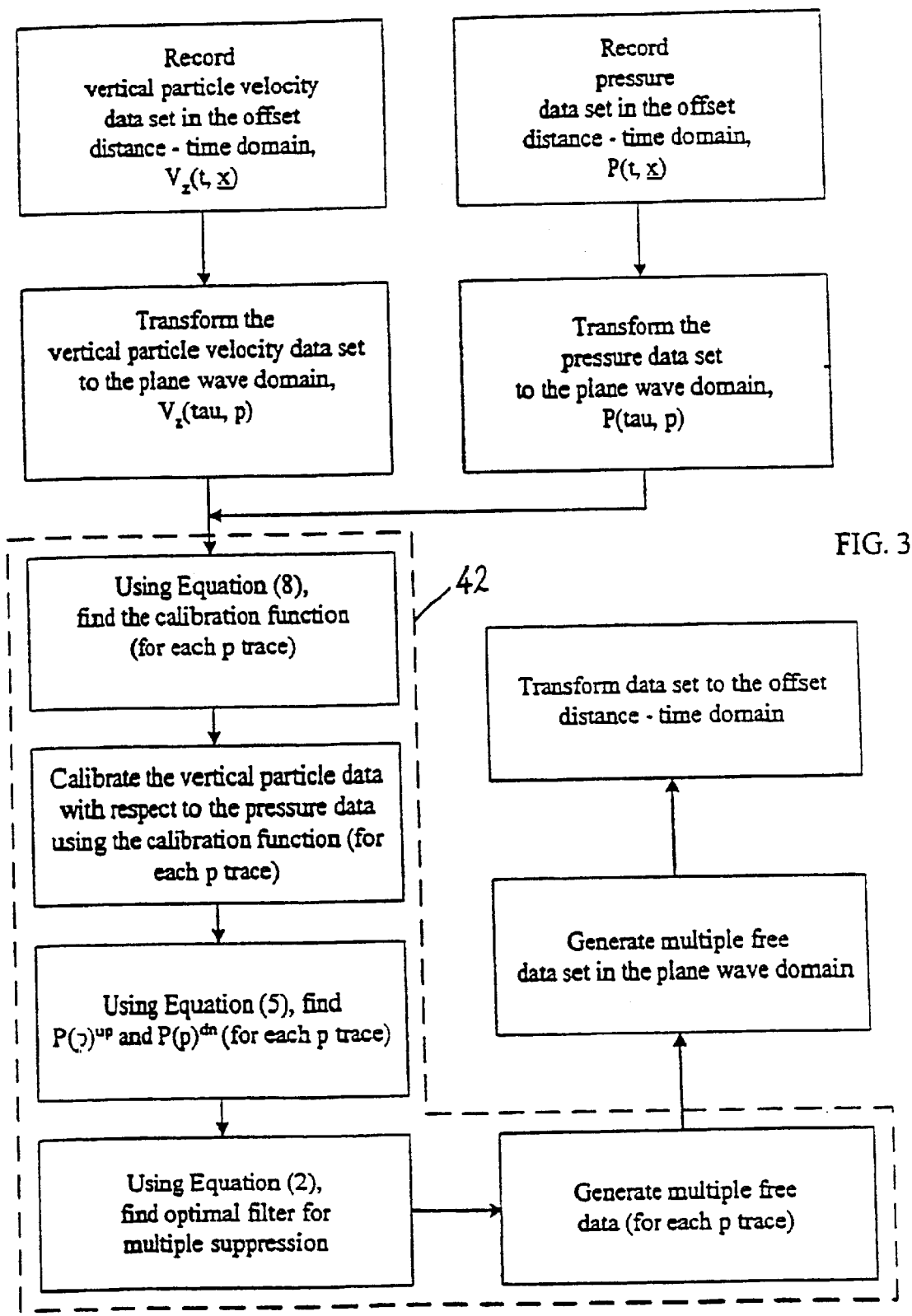
FIG. 3 is a flow diagram representing a method of processing marine seismic survey data that takes into consideration the angle dependency of the sensor response and the angle dependency of the upgoing and downgoing wavefields.
Figures 5A, 5B:
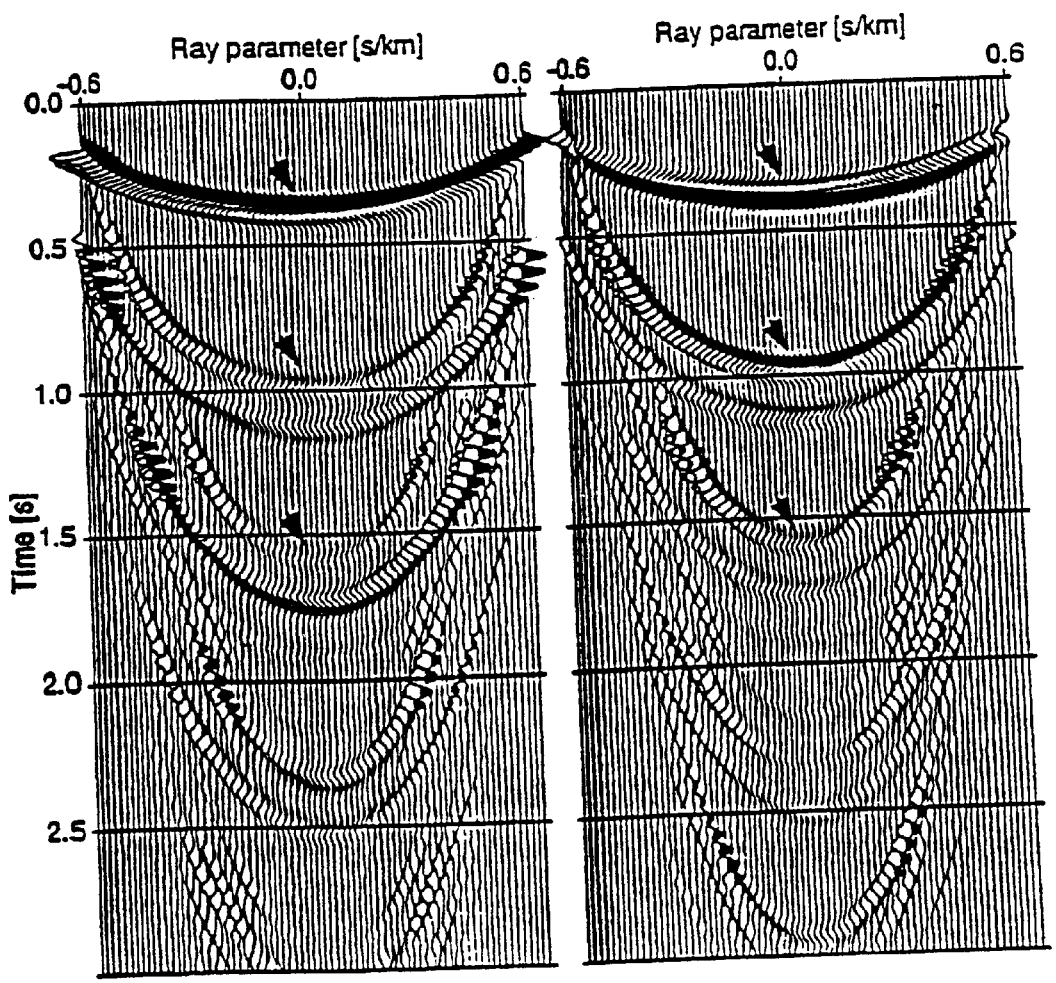
FIGS. 5a and 5b show the data represented in FIGS. 4a and 4b transformed to the plane wave domain.
Figures 6A, 6B:
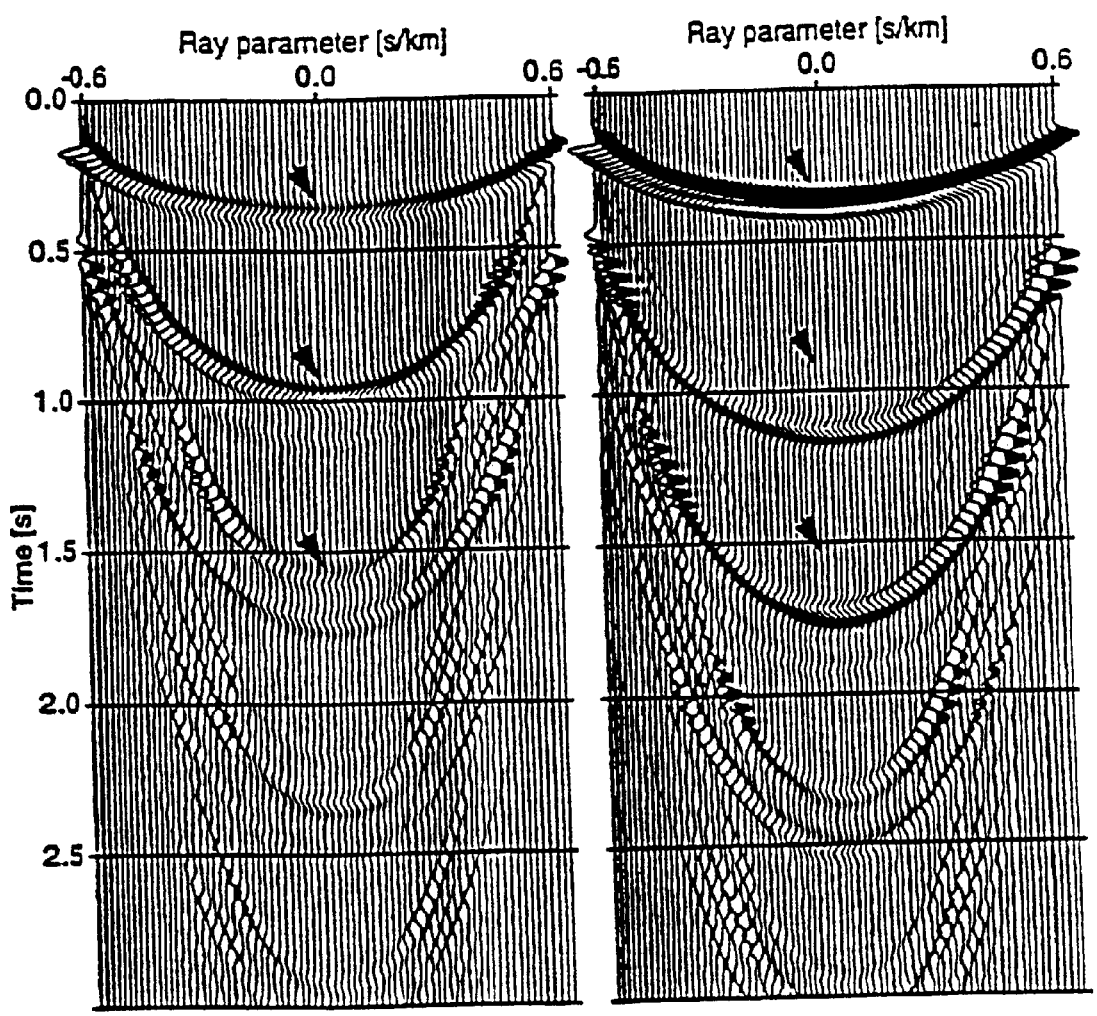
FIGS. 6a and 6b show the calculated separated upgoing wavefield and the corresponding calculated downgoing wavefield, respectively.
Figures 7A, 7B:
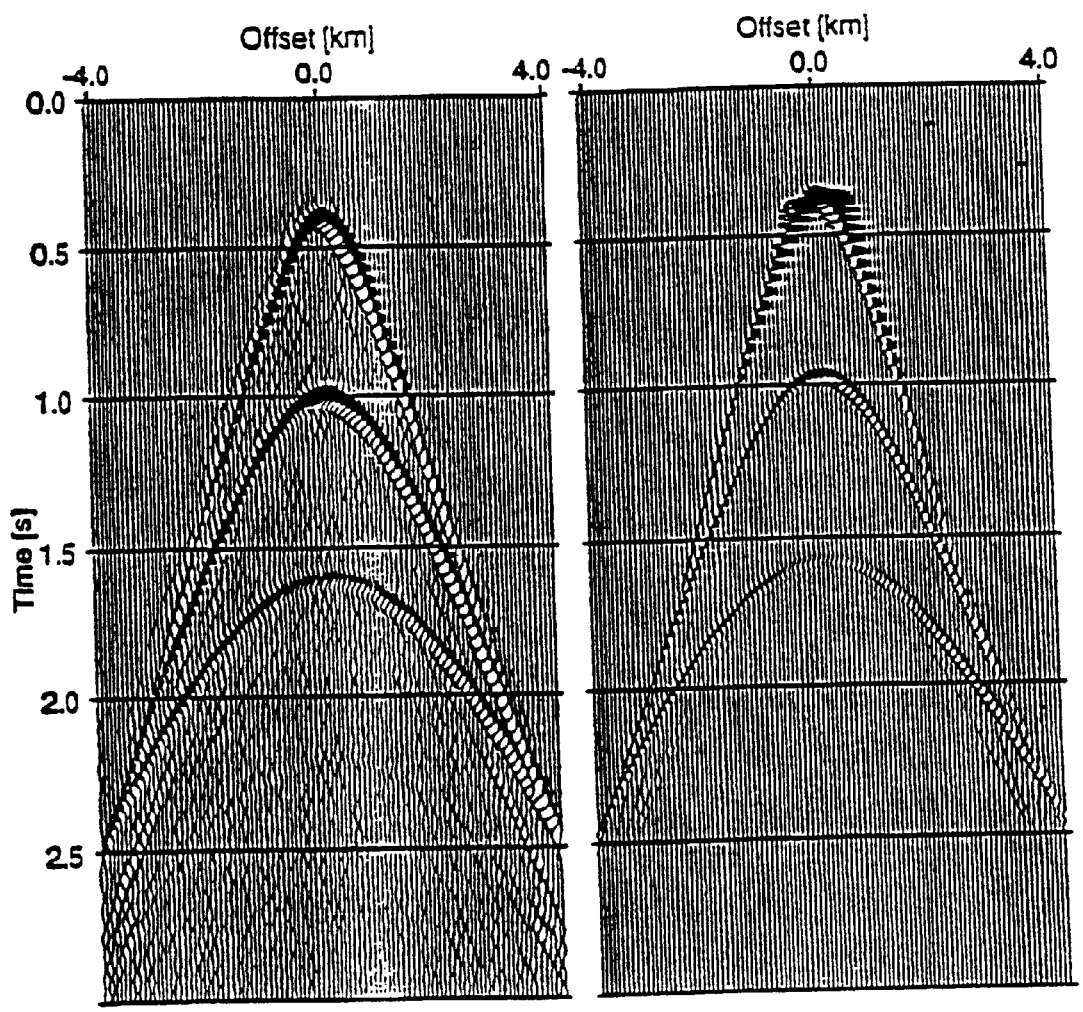
FIG. 7a shows the multiple attenuation results in the distance-time domain.
FIG. 7b shows the location of the simulated primaries of the model.

The methodology for one embodiment of processing two-component marine sensor data is shown diagrammatically in FIG. 3. FIG. 3 shows that the data is first collected and recorded in the offset distance-time domain. The data is then transformed to the plane wave domain, $\tau$-p. Each p trace of the transformed data set is converted into multiple free data by the application of the steps illustrated within block 42. For each p trace of the transformed data set, a calibration function is numerically calculated based on equation (8). The calibration function is then used to calibrate the vertical particle velocity data with respect to the pressure data. The calibrated data is then used to find information corresponding to the upgoing and downgoing wavefields. The upgoing and downgoing wavefield information is used to numerically solve for an optimal filter to suppress multiples by applying Equation (2). The optimal filter for the p trace is then used to generate multiple free data for the p trace. The generated multiple free data for each p trace forms a multiple free data set. The multiple free data sets are transformed back to the offset time domain.

FIGS. 4–7 show an application of one example embodiment of processing two-component marine seismic data to a 1-D four layer acoustic model. The hydrophone and geophone data are shown in FIGS. 4a and 4b. FIGS. 5a and 5b show the τ-p transformation of the data. The pressure shown in FIG. 5b is then decomposed into an angle dependent estimate of the upgoing wavefield and the downgoing wavefield by applying equation (5). The upgoing wavefield is shown in FIG. 6a, and the downgoing wavefield is shown in FIG. 6b. The reflectivity of the model is computed by deconvolving the downgoing wavefield from the upgoing wavefield in the τ-p domain. Following an inverse τ-p transform, the final result in the x-t domain is obtained and shown in FIG. 7a. By comparing the results shown in FIG. 7a with the original data sets shown in FIGS. 4a and 4b, and with the simulated primary reflections of the model as shown in FIG. 7b, it is seen that the method of processing two-component marine seismic data attenuates the multiples in the data and recovers the reflectivity of the model. In FIGS. 4–7, the arrows point out the location of the three primary interfaces, which represent the water-land interface, and two subterranean interfaces.

Figure 8:
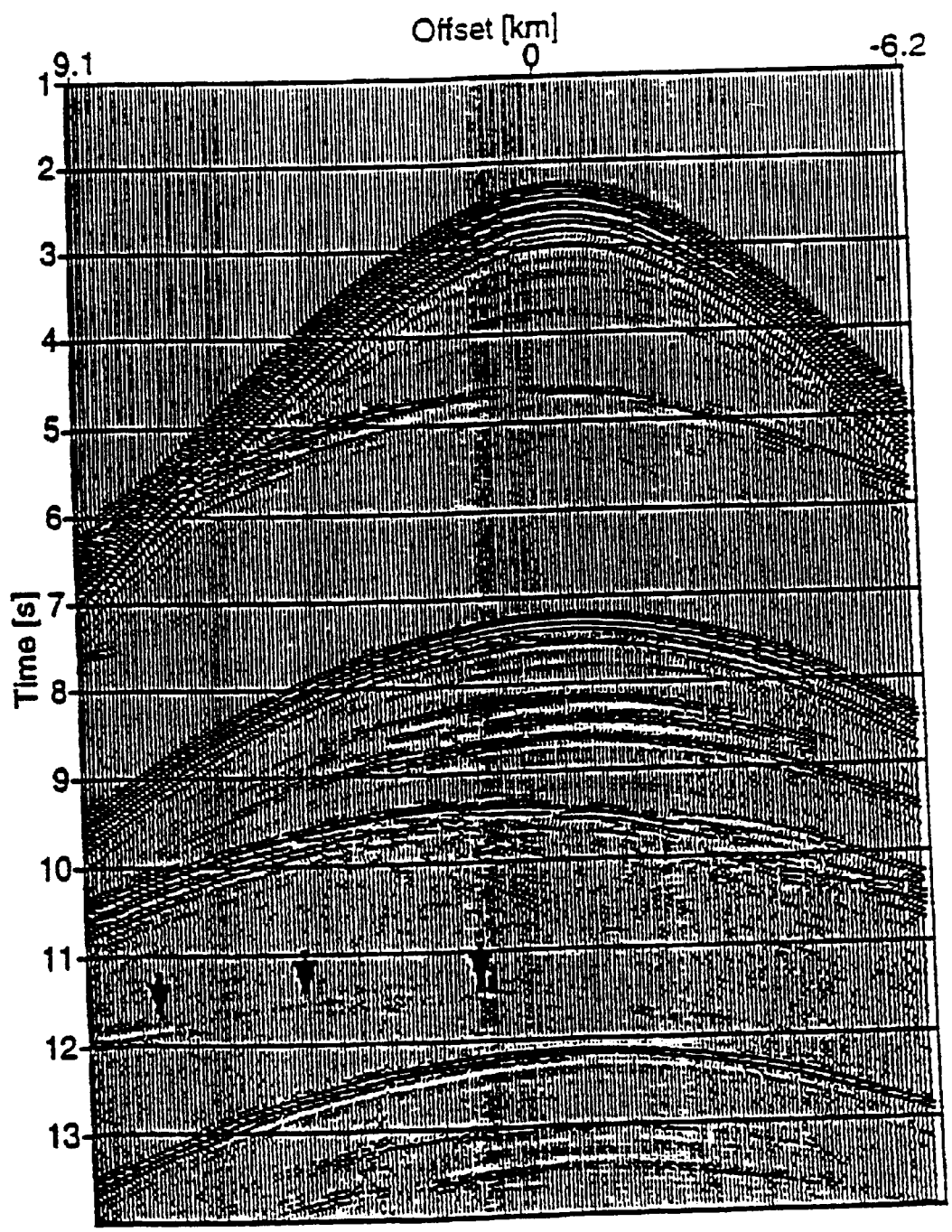
FIG. 8 shows hydrophone data from an offshore ocean bottom experiment in the South China Sea.
Figure 9:
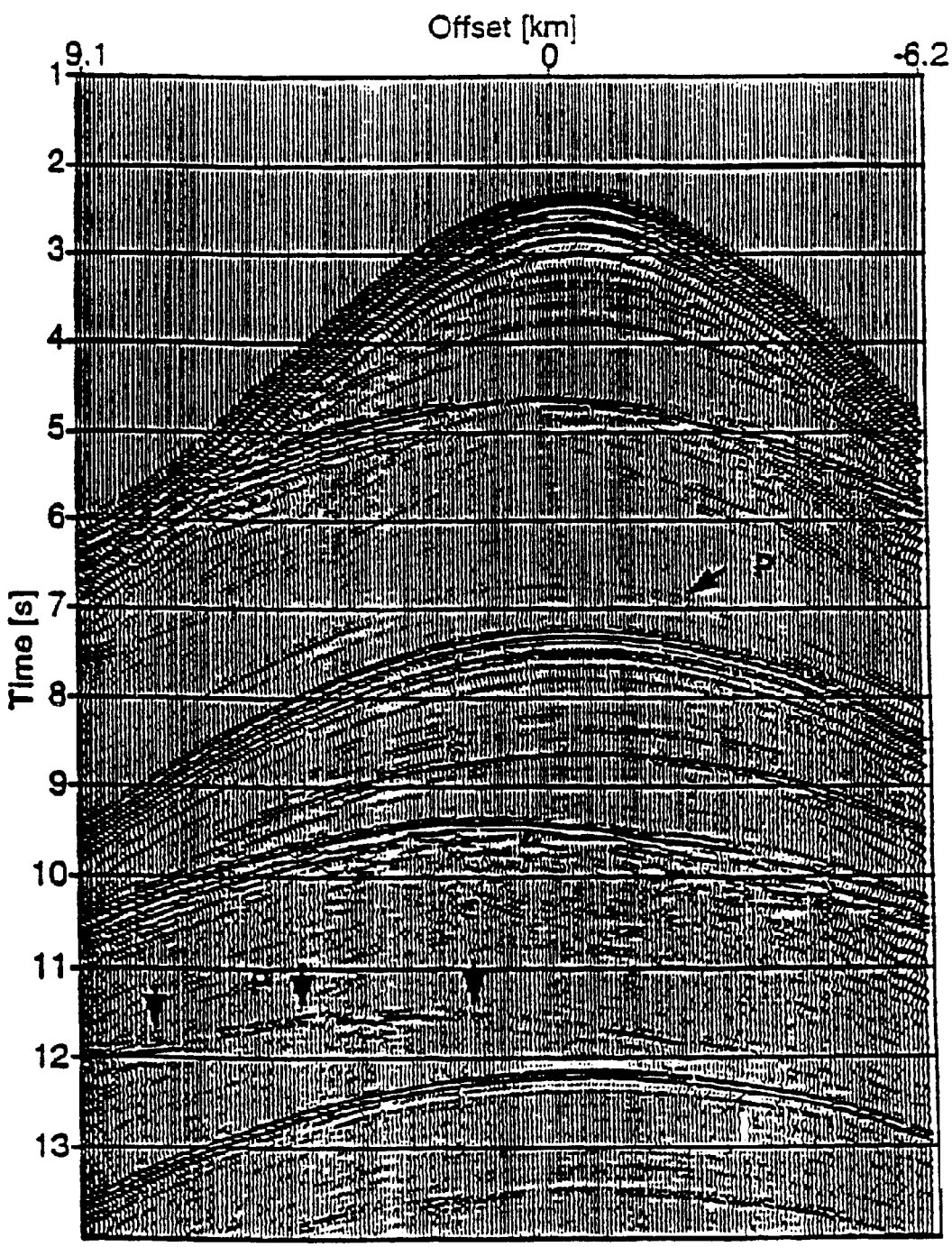
FIG. 9 shows corresponding geophone data for the ocean bottom experiment in the South China Sea depicted in FIG. 8.
Figure 10:
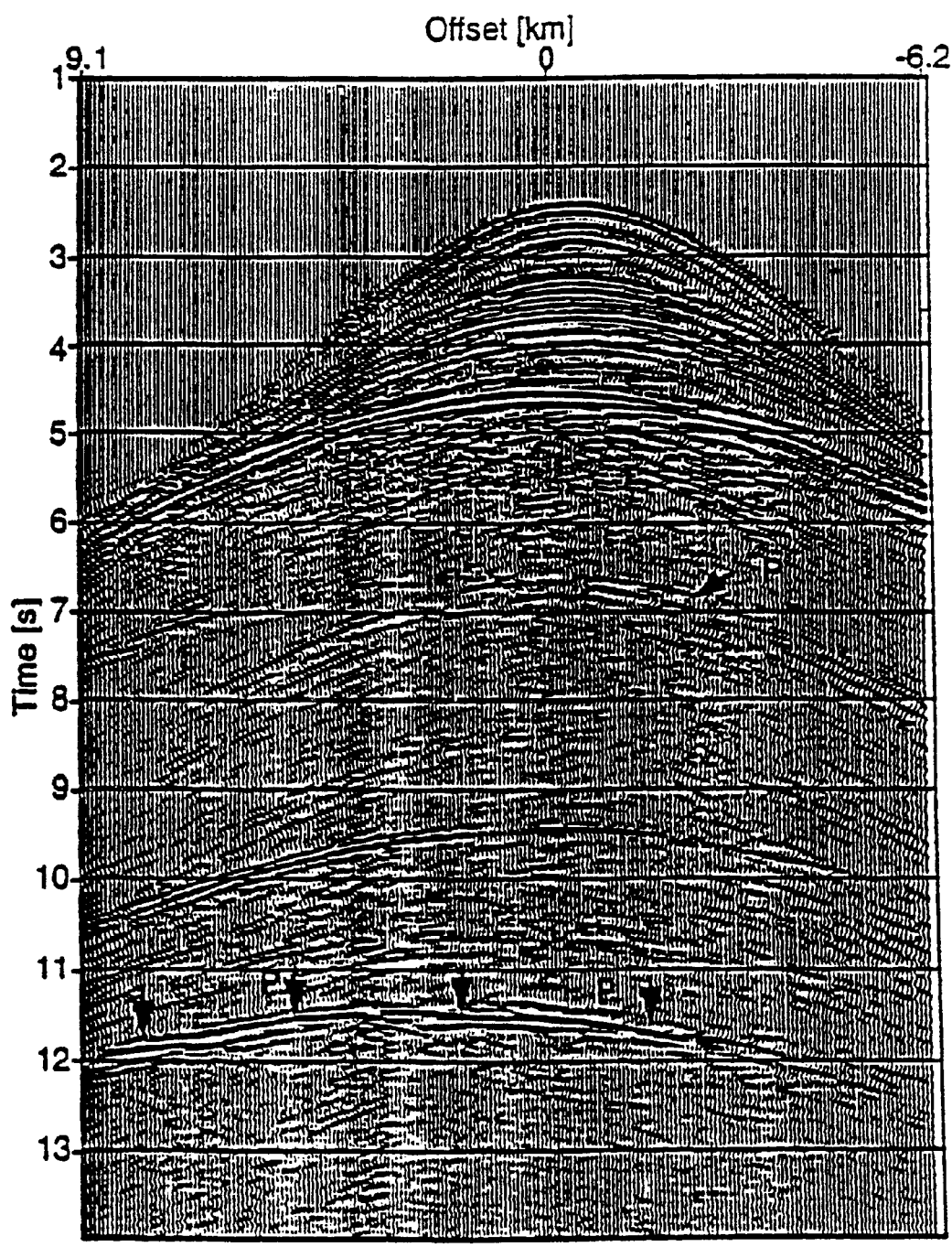
FIG. 10 shows the multiple attenuation results obtained after processing the data represented in FIGS. 8 and 9.

One example embodiment of the method has also been applied to ocean bottom dual sensor data collected in the South China Sea. FIG. 8 shows the pressure data, and FIG. 9 shows the corresponding vertical particle velocity. After transforming to the plane wave domain, the geophone data is calibrated before separating the upgoing and downgoing wavefields. The final result of multiple attenuation is shown in FIG. 10. For comparison with the original data, the result has been convolved with a zero phase wavelet derived from the autocorrelation of each p trace in the hydrophone data before inverse τ-p transform. As shown in FIG. 10, the multiples have been attenuated, and more importantly, the primary reflections, which are marked by arrows, have been preserved.

The primary reflections were not strongly visible in the original data due to the presence of strong multiples.

In an even further embodiment of the present invention, the signal is conditioned before the multiple elimination procedure is applied. In an alternate embodiment, the signal is conditioned after the multiple elimination procedure is applied.

In still a further embodiment, angle dependence is contained in the vertical velocity plane wave seismogram and the pressure plane wave seismogram. Differences in the response are due to the differences in wave types recorded and in the recording sensors. As described above, in various embodiments, minimizing the source time duration defines an angle dependent filter, which is used to calibrate the two plane wave seismograms.

In still a further embodiment, a conventional predictive deconvolution is applied to the plane wave pressure and vertical seismograms. In a further embodiment, the predictive deconvolution is applied in the plane wave domain. In alternate embodiments, the deconvolution is applied to the data together or independently. In one embodiment, the result is that each will now have the short time duration components of the angle dependent responses, which arise from each sensor (geophone and hydrophone) removed.

In still a further embodiment, following the angle dependent deconvolution, each seismogram is bandpass filtered to the same frequency band. In yet a further embodiment, an amplitude calibration is performed for the deconvolved and bandpass filtered plane wave pressure and vertical velocity seismograms. In one embodiment, the amplitude calibration uses time signal moving average operators for each plane wave component to define the mean signal level. In further example embodiments, the time signal moving averaging is achieved through the following equations:

$$\hat{P}(\tau_i, p) = \frac{1}{2k} \sum_{j=i-k}^{i+k} P(\tau_j, p) \qquad (9)$$

$$\hat{V}_z(\tau_i, p) = \frac{1}{2k} \sum_{j=i-k}^{i+k} V_z(\tau_j, p). \qquad (10)$$

In still a further embodiment, an inter-seismogram calibration further comprises comparing an average of pressure seismograms with an average of vertical velocity seismograms for each pair (pressure and vertical velocity) of plane wave seismograms. In yet a further embodiment, equations (9) and (10) are used in equation (8) for calibration.

In another embodiment, the vertical velocity signal average is normalized to that of the pressure average to define the amplitude correction on a time sample by time sample basis. In a further embodiment, the time signal moving average operator length k is varied to achieve the optimum calibration. Predictive deconvolution followed by moving averaging of signals applied to plane wave seismograms introduces stability and results in robust estimates of multiple free seismograms.

In a further embodiment, a method of attenuation of multiple reflections in seismic data is provided. The seismic data comprises pressure data and particle velocity data. The method comprises deconvolving the seismic data, and applying a moving average operator to the seismic data.

In a further embodiment, said deconvolving the seismic data further comprises applying a predictive deconvolution to the seismic data. In a further embodiment, applying a predictive deconvolution to the seismic data further comprises applying a predictive deconvolution to the pressure data and the particle velocity data independently. In alternate embodiments, a deconvolution is applied such as a spiking deconvolution, gapped deconvolution, statistical deconvolution, deterministic deconvolution or any other deconvolution that will occur to those of ordinary skill in the art.

In still a further embodiment, the method further comprises bandpass filtering the seismic data. In a further embodiment, the method further comprises bandpass filtering the pressure data and the particle velocity data independently.

In a further embodiment, the method comprises amplitude calibrating the seismic data. In a further embodiment, said amplitude calibrating further comprises defining a mean signal level.

In a further embodiment, said applying a moving average operator further comprises applying essentially the following formula:

$$\hat{P}(\tau_i, p) = \frac{1}{2k} \sum_{j=i-k}^{i+k} P(\tau_j, p).$$

In a further embodiment, said applying a moving average operator further comprises applying essentially the following formula:

$$\hat{V}_z(\tau_i, p) = \frac{1}{2k} \sum_{j=i-k}^{i+k} V_z(\tau_j, p).$$

In still a further embodiment, a system for attenuation of multiple reflections in seismic data is provided. The seismic data comprises pressure data and particle velocity data. The system comprises means for deconvolving the seismic data, and means for applying a moving average operator to the seismic data. In alternate embodiments, the means for deconvolving the seismic data comprises a computer, a workstation, software, software running on any computer, or any other means for deconvolving the seismic data that will occur to those of ordinary skill in the art. In alternate embodiments, the means for applying a moving average operator to the seismic data comprises a computer, a workstation, software, software running on any computer, or any other means for applying a moving average operator to the seismic data that will occur to those of ordinary skill in the art.

In a further embodiment, said means for deconvolving the seismic data further comprises means for applying a predictive deconvolution to the seismic data. In alternate embodiments, the means for applying a predictive deconvolution to the seismic data comprises a computer, a workstation, software, software running on any computer, or any other means for applying a predictive deconvolution to the seismic data that will occur to those of ordinary skill in the art.

In a further embodiment, said means for applying a predictive deconvolution to the seismic data further comprises means for applying a predictive deconvolution to the pressure data and the particle velocity data independently. In alternate embodiments, the means for applying a predictive deconvolution to the pressure data and the particle velocity data independently comprises a computer, a workstation, software, software running on any computer, or any other means for applying a predictive deconvolution to the pressure data and the particle velocity data independently that will occur to those of ordinary skill in the art.

In a further embodiment, the system further comprises means for bandpass filtering the seismic data. In alternate embodiments, the means for bandpass filtering the seismic data comprises a computer, a workstation, software, software running on any computer, or any other means for bandpass filtering the seismic data that will occur to those of ordinary skill in the art.

In a further embodiment, the system further comprises means for amplitude calibrating the seismic data. In alternate embodiments, the means for amplitude calibrating comprise a computer, a workstation, software, software running on any computer, or any other means for amplitude calibrating that will occur to those of ordinary skill in the art.

In a further embodiment, said means for applying a moving average operator further comprises means for applying a time signal moving average operator. In alternate embodiments, the means for applying a time signal moving average operator comprises a computer, a workstation, software, software running on any computer, or any other means for applying a time signal moving average operator that will occur to those of ordinary skill in the art.

In a further embodiment, said means for applying a moving average operator to the seismic data further comprises means for inter-seismogram averaging. In alternate embodiments, the means for inter-seismogram averaging comprises a computer, a workstation, software, software running on any computer, or any other means for inter-seismogram averaging that will occur to those of ordinary skill in the art.

In a further embodiment, means for inter-seismogram calibration further comprises means for comparing an average of the particle velocity data and the pressure data. In alternate embodiments, the means for comparing an average of the particle velocity data and the pressure data comprises a computer, a workstation, software, software running on any computer, or any other means for comparing an average of the particle velocity data and the pressure data that will occur to those of ordinary skill in the art.

In a further embodiment, the system further comprises means for normalizing the particle velocity data. In alternate embodiments, the means for normalizing comprises a computer, a workstation, software, software running on any computer, or any other means for normalizing that will occur to those of ordinary skill in the art.

In a further embodiment, the system further comprises means for normalizing the pressure data. In alternate embodiments, the means for normalizing comprises a computer, a workstation, software, software running on any computer, or any other means for normalizing that will occur to those of ordinary skill in the art.

In a further embodiment, seismic data is provided. The seismic data is processed by a method comprising deconvolving the seismic data; and applying a moving average operator to the seismic data.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method of attenuation of multiple reflections in seismic data, wherein the seismic data comprises pressure data and particle velocity data, the method comprising:

deconvolving the seismic data in the plane wave domain; and applying a time signal moving average operator to the seismic data, using essentially the following formulae:

$$\hat{P}(\tau_i, p) = \frac{1}{2k} \sum_{j=i-k}^{i+k} P(\tau_j, p)$$

$$\hat{V}_z(\tau_i, p) = \frac{1}{2k} \sum_{j=i-k}^{i+k} V_z(\tau_j, p).$$

2. The method of claim 1, wherein said deconvolving the seismic data further comprises applying a predictive deconvolution to the seismic data.

3. The method of claim 2, wherein said applying a predictive deconvolution to the seismic data further comprises applying a predictive deconvolution to the pressure data and the particle velocity data independently.

4. The method of claim 1, further comprising bandpass filtering the seismic data.

5. The method of claim 4, further comprising bandpass filtering the pressure data and the particle velocity data independently.

6. The method of claim 1, comprising amplitude calibrating the seismic data.

7. The method of claim 6, wherein said amplitude calibrating further comprises defining a mean signal level.

8. The method of claim 1, wherein said applying a moving average operator to the seismic data further comprises inter-seismogram calibration.

9. The method of claim 8, wherein said inter-seismogram calibration further comprises comparing an average of the particle velocity data and the pressure data.

10. The method of claim 1, further comprising normalizing the particle velocity and pressure data.

11. A system for attenuation of multiple reflections in seismic data, wherein the seismic data comprises pressure data and particle velocity data, the system comprising:

means for deconvolving the seismic data in the plane wave domain; and means for applying a time signal moving average operator to the seismic data, using essentially the following formulae:

$$\hat{P}(\tau_i, p) = \frac{1}{2k} \sum_{j=i-k}^{i+k} P(\tau_j, p)$$

$$\hat{V}_z(\tau_i, p) = \frac{1}{2k} \sum_{j=i-k}^{i+k} V_z(\tau_j, p).$$

12. The system of claim 11, where said means for deconvolving the seismic data further comprises means for applying a predictive deconvolution to the seismic data.

13. The system of claim 11, further comprising means for bandpass filtering the seismic data.

14. The system of claim 11, comprising means for amplitude calibrating the seismic data.

15. The system of claim 14, wherein said means for amplitude calibrating further comprises means for defining a mean signal level.

16. The system of claim 11, wherein said means for applying a moving average operator to the seismic data further comprises means for inter-seismogram calibration.

17. The system of claim 16, wherein said means for inter-seismogram calibration further comprises means for comparing an average of the particle velocity data and the pressure data.

18. The system of claim 11, further comprising means for normalizing the particle velocity and pressure data.

19. Seismic data with two components processed by a method comprising:

deconvolving the seismic data in the plane wave domain; and applying a time signal moving average operator to the seismic data, using essentially the following formulae for the two components:

$$\hat{P}(\tau_i, p) = \frac{1}{2k} \sum_{j=i-k}^{i+k} P(\tau_j, p)$$

$$\hat{V}_z(\tau_i, p) = \frac{1}{2k} \sum_{j=i-k}^{i+k} V_z(\tau_j, p).$$

where the time signal moving operator length k is varied to achieve substantially optimum calibration.

* * * * *